US006373023B1

(12) United States Patent
Hoskins et al.

(10) Patent No.: US 6,373,023 B1
(45) Date of Patent: Apr. 16, 2002

(54) ARC DISCHARGE INITIATION FOR A PULSED PLASMA THRUSTER

(75) Inventors: William A. Hoskins, Redmond; Robert J. Cassady, Bellevue, both of WA (US)

(73) Assignee: General Dynamics (OTS) Aerospace, Inc., Redmond, WA (US)

( * ) Notice: Subject to any disclaimer, the term of this patent is extended or adjusted under 35 U.S.C. 154(b) by 0 days.

(21) Appl. No.: 09/517,548

(22) Filed: Mar. 2, 2000

Related U.S. Application Data

(60) Provisional application No. 60/122,490, filed on Mar. 2, 1999.

(51) Int. Cl.[7] .......... B23K 10/00

(52) U.S. Cl. .......... 219/121.52; 219/121.48

(58) Field of Search .......... 219/121.52, 121.48, 219/121.36, 121.57, 121.54; 60/203.1, 253, 202; 244/172; 315/111.21, 111.41; 392/485

(56) References Cited

U.S. PATENT DOCUMENTS

| | | | | |
|---|---|---|---|---|
| 3,178,883 A | | 4/1965 | Webb | |
| 3,984,072 A | | 10/1976 | von Pragenau et al. | 244/169 |
| 4,143,314 A | | 3/1979 | Gruber | 323/15 |
| 4,325,124 A | | 4/1982 | Renner | 364/459 |
| 4,537,375 A | | 8/1985 | Chan | 244/171 |
| 4,585,191 A | | 4/1986 | Blount | 244/169 |
| 4,787,579 A | | 11/1988 | Smith | 244/169 |
| 4,821,509 A | | 4/1989 | Burton et al. | 60/203.1 |
| 4,825,646 A | | 5/1989 | Challoner et al. | 60/202 |
| 4,919,367 A | | 4/1990 | Whitcomb | 244/164 |
| 5,133,518 A | | 7/1992 | Flament | 244/173 |
| 5,140,525 A | | 8/1992 | Shankar et al. | 264/459 |
| 5,305,971 A | | 4/1994 | Decanini | 244/168 |
| 5,312,073 A | | 5/1994 | Flament et al. | 244/168 |
| 5,349,532 A | | 9/1994 | Tilley et al. | 364/459 |
| 5,383,631 A | | 1/1995 | Mazzini | 244/169 |
| 5,439,191 A | | 8/1995 | Nichols et al. | 244/169 |
| 5,528,502 A | | 6/1996 | Wertz | 364/459 |
| 5,626,315 A | | 5/1997 | Flament et al. | 244/168 |
| 5,687,933 A | | 11/1997 | Goodzeit et al. | 244/169 |
| 5,738,308 A | | 4/1998 | Haag | 244/169 |
| 5,813,217 A | | 9/1998 | Beall | 60/202 |
| 5,924,278 A | * | 7/1999 | Burton et al. | 60/203.1 |
| 6,153,976 A | * | 11/2000 | Spanjers | 315/111.21 |

OTHER PUBLICATIONS

Flight Qualified Pulsed Electric Thruster for Satellite Control, R.J. Vondra and K.L. Thomassen, *J Spacecraft and Rockets,* vol. 11, No. 9, pp613–617, 1974.

Solid Propellant Pulsed Plasma Propulsion System Development for N–S Stationkeeping, D.J. Palumbo, Princeton/AIAA.DGLR 14th International Electric Propulsion Conference, AIAA–79–2097 pp. 1–6, 1979.

Surface flashover of solid dielectric in vacuum, S. Pillai and R. Hackam, *J Appl Phys* vol. 53, No 4, pp.2983–2987, Apr. 1982.

Pulsed Plasma Thruster Ignition Study, G. Aston, L.C. Pless and M.E. Brady, AFRPL–TR–81–105, May, 1982.

Pulsed Plasma Mission Endurance Test (excerpts only), R.J. Cassidy, Rocket Research Company Final Report for the Period Sep. 1984–Jul. 1989, pp.1–7, 41 1989.

Operational Nova Spacecraft Teflon Pulsed Plasma Thruster System, Ebert, Kowal, and Sloan, AIAA/ASME/SAE/ASEE 25th Joint Propulsion Conference, AIAA–89–2497 pp.1–10, 1989.

Surface Flashover of Insulators, H.C. Miller, *IEEE Transactions on Electrical Insulation,* vol. 24, No. 5, pp. 765–786, Oct. 1989.

'Triggerless' triggering of Vacuum Arcs, A. Anders et al., *J Pys D: Appl Phys,* vol. 31, pp 584–7, 1998.

Development of a PPT for the EO–1 Spacecraft, S.W. Benson, AIAA 35th Joint Propulsion Conference, AIAA–99–2276, 1999.

* cited by examiner

*Primary Examiner*—Teresa Walberg
*Assistant Examiner*—Quang Van
(74) *Attorney, Agent, or Firm*—William B. Slate; Wiggin & Dana

(57) ABSTRACT

Thermionic emission of electrons is utilized to initiate arc discharge in a pulsed plasma thruster.

26 Claims, 4 Drawing Sheets

ARC DISCHARGE INITIATION FOR A PULSED PLASMA THRUSTER

CROSS REFERENCE TO RELATED APPLICATION

This patent application claims priority of U.S. Provisional Patent Application Serial No. 60/122,490 entitled "ARC DISCHARGE INITIATION FOR A PULSED PLASMA THRUSTER" that was filed on Mar. 2, 1999, the disclosure of which is incorporated by reference in its entirety herein as if set forth at length.

BACKGROUND OF THE INVENTION (1) Field of the Invention

This invention relates to thrusters, and more particularly to arc initiators for pulsed plasma thrusters for spacecraft.

(2) Description of the Related Art

A background in pulsed plasma thruster (PPT) technology may be found in Cassady, R. Joseph, "Pulsed Plasma Mission Endurance Test", Air Force Report #AFAL-TR-88-105, August, 1989, the disclosure of which is incorporated herein by reference in its entirety as if set forth at length.

The surge in the use of small spacecraft, especially in deep space constellations, such as ST-3 or Terrestrial Planet Finder (TPF), and in Earth sensing missions, such as EO-1, demands new onboard propulsion solutions. These missions often require a challenging combination of fine impulse control, high specific impulse and maximum thrust for minimum power. PPT's bring proven flight heritage, inert storage, very small impulse bits and high specific impulse for small, low power spacecraft. PPT's also present the option for providing an all-thruster attitude control system (ACS) for any size spacecraft, eliminating the need for wheels and momentum dumping thrusters and resulting in a significant net ACS mass savings.

Typical PPT's are inherently simple, inert and self-contained devices that use an inert solid propellant, typically polytetrafluoroethylene (PTFE), that is ablated and electromagnetically accelerated by an electric arc between two electrodes, very similarly to a plasma "rail gun". An anode is spaced apart from the cathode (e.g., by an exemplary distance on the order of an inch in a parallel plate thruster configuration). A power source charges an energy storage device (e.g., a capacitor) to anywhere from one to one thousand joules, although 20 joules is a typical value. This charge places the anode at a potential of about 500–3000 volts above the cathode. A separate spark plug is used to initiate the arc discharge. Once the propellant is ablated and ionized by the arc, it is accelerated between the electrodes under the action of a Lorentz body force.

Several first-generation PPT's have been flown in existing spacecraft. A recent PPT system has a total mass, including thruster, electronics, propellant and propellant feed system of around 5 kg. That system can potentially deliver 15,000 N-s, in impulse bits of a fraction of a mN-s for an input power under 100 W. Input power is usually delivered at 28 V, also enhancing the integrability with most spacecraft busses. A PPT system with 8 thrusters an order of magnitude smaller is presently being developed in conjunction with Primex Aerospace Company for the University of Washington Dawgstar satellite, a 10 kg-class spacecraft.

Despite the very promising flight history of PPT's and recent dramatic improvements in PPT design, there are key aspects of the PPT for which improvement would lead to significant reductions in mass, complexity and integration costs. One such area that could hold the key to considerably more widespread usage of PPT's is in its discharge initiation.

Existing methods for initiating (igniting) a PPT discharge present cost and reliability concerns. A common configuration places an annular semiconductor spark plug in the thruster cathode. A spark plug design consisting of a set of coaxial electrodes separated by a ceramic bushing, one end of which is fused with semiconducting material, has been used successfully for many years to ignite PPTs in conjunction with circuitry designed to cause this plug to form a spark under vacuum conditions. An energy storage device (e.g., a capacitor), separate from the main energy storage capacitor, is charged to on the order of half a joule. When coupled by a high voltage switch to the spark plug, this smaller energy storage capacitor induces a flashover between the electrodes of the plug. A basic discussion of flashover and theorized flashover mechanisms is discussed in H. Craig Miller, "Surface Flashover of Insulators", IEEE Transactions on Electrical Insulation, Vol. 24 No. 5, October 1989, Pages 765–786, the disclosure of which is incorporated herein by reference in its entirety as if set forth at length. See also, Palumbo, D. J., "Solid Propellant Pulsed Plasma Propulsion System Development for N-S Stationkeeping", AIAA Paper 79–2097, 14th IEPC, Princeton, N.J., 1979.

The spark across the spark plug produces electrons which are drawn toward the thruster anode. As the electrons are drawn to the anode, they come into contact with propellant (such as along the exposed surface of a fuel bar) causing ionization of and electron release from the propellant and initiating the main arc between the thruster anode and cathode. The energy released in the main arc may be approximately one hundred times greater than the energy released in the arc across the spark plug.

Existing spark plugs as well as some of the associated high voltage equipment (e.g., insulated gate bipolar transistors (IGBT)) present particular reliability risks. In addition to unexpected failure, existing spark plugs have inherent lifetime limitations. The plugs can easily be the life limiting component for the entire PPT system, providing less than one million pulses under some circumstances, up to a maximum proven life of ten million pulses for a known configuration. Future uses of PPT's will require twenty-forty million pulse lifetimes or greater. Aside from total failure of the spark plugs, performance decay over the functional lifetime of the spark plug can produce associated changes in thruster performance. By way of example, a new spark plug may have a breakdown voltage of as low as about 200 volts. Over its lifetime, the breakdown voltage will increase, for example to about 2,000 volts. Another performance concern is the more random shot-to-shot variability of PPT thrust pulses. Studies have shown that much of this variability can be correlated with variability in the location of the discharge initiation spark, which, due to the annular design of existing spark plugs, is relatively wide. For smaller PPT designs the impact of this problem becomes more significant.

Another problem associated with PPT's is electromagnetic interference (EMI). Studies have shown that a significant fraction of the EMI signature of a PPT is due to the spark event, which is a comparatively high frequency phenomenon relative to the main arc discharge (further into the frequency range of concern for EMI).

Another issue is weight. The circuitry utilized to generate the fast, high voltage, spark of the spark plug can occupy approximately one-half of the electronics board area for a PPT. By way of example, an exemplary circuit includes an 800 volt source and a 3:1 step up to achieve the necessary spark plug breakdown voltages anticipated over the plug's lifetime.

BRIEF SUMMARY OF THE INVENTION

The invention seeks to initiate arc discharge by preferably introducing electrons very close to the propellant. This may be achieved by thermionic emission of electrons. The thermionic emission can be provided via relatively low voltage circuitry which can reduce weight and EMI as well as cost and, potentially, power consumption. Thruster life may be significantly improved via use of components which are not subject to significant erosion and/or use of components which, although subject to erosion, are replenished such as in the self-feeding mounting of a propellant bar.

Accordingly in one aspect the invention is directed to a pulsed plasma thruster comprising a pair of electrodes being an anode and a cathode spaced apart from the anode. A voltage source applies a voltage between the cathode and the anode to positively charge the anode relative to the cathode; a solid propellant bar extends longitudinally and is held for progressive advancement in a downstream longitudinal direction to a gap between the cathode and anode. An initiator initiates arc discharge between the anode and cathode by inducing thermionic emission of electrons, which electrons are drawn toward the anode and tend to induce ionization of material on an exposed surface of the bar so as to initiate said arc discharge in a flashover.

The voltage source may comprise a capacitive energy storage device which discharges to provide the arc discharge. The electrons may be emitted from a member selected from the group consisting of a surface portion of the bar; a conductive member integral with the bar; a conductive member separate from the bar and held for progressive advancement to maintain engagement with the cathode as material is removed from an end of the conductive member; an electrode of an electron gun; a portion of the cathode; and a residue on a window, which residue results from prior arc discharges. The initiator may comprise a laser, positioned to direct a laser beam to ablate and ionize material from an exposed surface portion of the bar. A thin, longitudinally-extending ablative member may be integral with the bar and the laser may be positioned to ablate and ionize material from the ablative member. The bar may consist essentially of PTFE and a laser may be positioned to ablate and ionize such PTFE. The initiator may comprise a laser, positioned to direct a beam through an aperture in at least a first electrode of the cathode and anode. The aperture may contain a window substantially transparent to the beam while a remainder of the first electrode is substantially opaque to the beam. The initiator may comprise a conductive member having a first end and a second end, the second end engageable with a first electrode of the anode and the cathode; and a second voltage source, coupled to the first electrode and to the first end of the conductive member, for inducing an electric current between the first electrode and the conductive member effective to resistively heat at least the conductive member at the second end thereof to induce said thermionic emission of electrons. The conductive member may be held for progressive advancement to maintain engagement with the first electrode as material is removed from the second end of the conductive member. The conductive member may be integral with the bar. The conductive member may be secured to a surface of the bar and the initiator may further comprise a thin layer of dielectric material secured to the conductive member opposite the bar. The conductive member may be embedded in the bar. The conductive member may be separate from the bar and held for said progressive advancement at least partially transverse to a downstream direction to maintain engagement with the first electrode (preferably the cathode) at an aperture therein. The conductive member may be contained within and advanceable through a dielectric outer sheath. The initiator may comprise an electron gun, positioned to direct said electrons into the gap between the cathode and anode.

In another aspect, the invention is directed to a pulsed plasma thruster comprising an anode and a cathode spaced apart from the anode. A voltage source applies a thruster voltage between the cathode and the anode to positively charge the anode relative to the cathode. A solid propellant bar is held for progressive advancement in a direction to a gap between the cathode and anode. An initiator initiates arc discharge between the anode and cathode by heating a material to an elevated temperature at which a local electric field resulting from the thruster voltage is sufficient to induce emission of electrons from said material, which emission of electrons is effective to initiate said arc discharge.

The material may be provided by a member selected from the group consisting of a surface portion of the bar; a conductive member integral with the bar; a conductive member separate from the bar and held for progressive advancement to maintain engagement with the cathode as said material is removed from an end of the conductive member; an electrode of an electron gun; a portion of the cathode; and a residue on a window, which residue results from prior pulses. The initiator may operate at voltages less than the thruster voltage.

In another aspect, the invention is directed to a solid propellant bar held for progressive advancement in a direction to a gap between the cathode and anode, a method for repeatedly initiating a thrust impulse. A thruster voltage is applied between a thruster cathode and a thruster anode to positively charge the anode relative to the cathode. A material is heated to an elevated temperature at which a local electric field resulting from the thruster voltage is sufficient to induce emission of electrons from said material, which emission of electrons is effective to initiate an arc discharge between the anode and cathode which arc discharge in turn ablates fuel from an exposed surface of the bar and ionizes said fuel into a plasma slug accelerates in a downstream direction producing an associated upstream impulse on the thruster. The heating may be timed so that the arc discharge is initiated in a target interval (e.g., preferably no greater than 10 ms) of the thruster voltage reaching a maximum voltage.

In another aspect, the invention is directed to a method for repeatedly initiating a thrust impulse. The thruster voltage is applied. A material is heated to an elevated temperature at which a local electric field resulting from an applied voltage no greater than the thruster voltage. The applied voltage is sufficient to induce emission of electrons from said material, which emission of electrons is effective to initiate an arc discharge between the anode and cathode which arc discharge in turn ionizes said propellant into a plasma slug which accelerates in a downstream direction producing an associated upstream impulse on the thruster. The applied voltage may be selected from the group consisting of the thruster voltage; a voltage applied between electrodes of an electron gun; a voltage applied to resistively heat a sacrificial member which is held for progressive advancement; and a voltage utilized to drive a laser. The applied voltage is preferably one or two orders of magnitude less than the thruster voltage.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
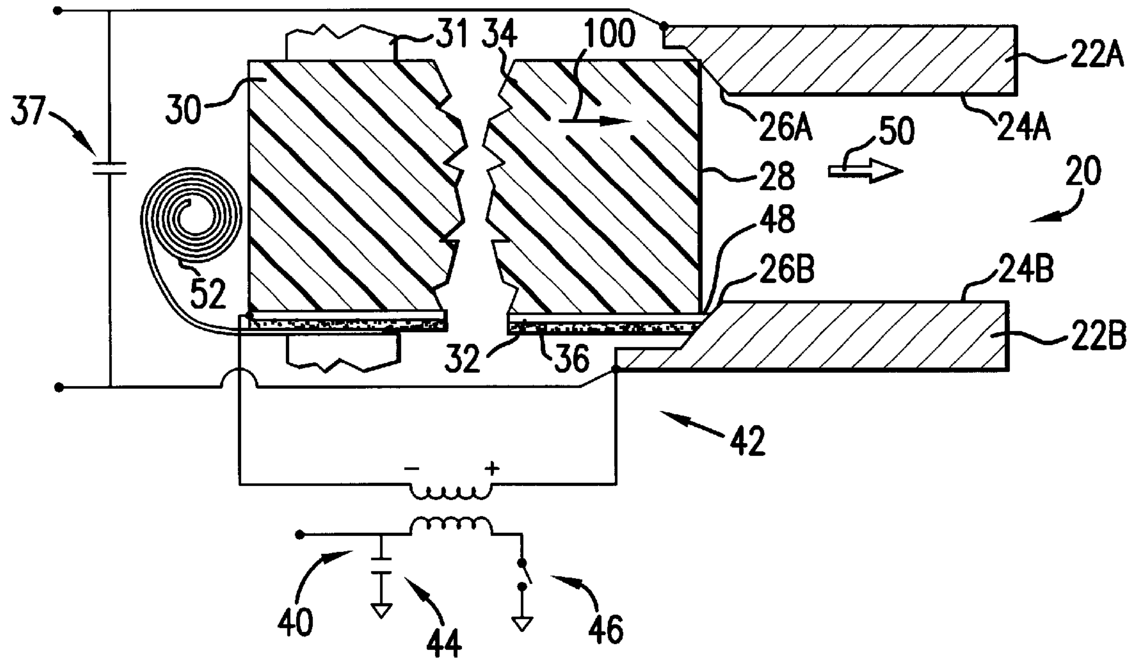
FIG. 1 is semi-schematic longitudinal sectional view of a first PPT ignition system according to principles of the invention.

FIG. 1 shows a first embodiment 20 of the invention which utilizes thermionic electron discharge from a sacrificial material to initiate PPT arc discharge. The thruster 20 includes a flat-plate anode and cathode 22A and 22B, respectively. Each has a substantially flat, opposed, inboard surface 24A, 24B parallel to each other and separated by an exemplary distance of about an inch. At upstream ends of the surfaces 24A, 24B, each electrode has a diverging surface 26A, 26B positioned to engage outboard portions of an end surface 28 of a propellant bar or bar assembly 30 held by a housing portion 31. The exemplary bar assembly includes a conductive material (e.g., a graphite sheet) 32 affixed to the side of a PTFE propellant bar 34. A thin layer or sheet 36 of a carbon based dielectric material (e.g., PTFE, polyethylene, or polyimide film tape), which tends to degrade to a conductive substance when exposed to heat, is secured over the conductive material. Both sheets are located on the side of the propellant bar which is fed into engagement with the PPT cathode. An energy storage device (e.g., a primary energy storage capacitor 37) is charged by a power source (e.g., a dc-dc power converter, not shown) to provide the potential between the PPT electrodes. A low voltage (e.g., about 28V) initiator circuit 40 is connected to the upstream end of the conductive sheet so that it does not interfere with normal feeding of the propellant bar. One side, e.g., the positive side 42 of the initiator circuit is connected to the PPT cathode. The initiator circuit, by way of an example including a capacitor 44 and a switch 46, stores low voltage electrical energy and then discharges it quickly, with high current, through the conductive sheet and PPT cathode. This heats regions 48 at the downstream ends of the conductive sheet and the now charred dielectric sheet to an elevated temperature. The elevated temperature allows electrons to be liberated by the existing electric field generated by the charge on the PPT electrodes. The heating may liberate electrons not simply from the downstream end of the conductive sheet but also from the dielectric sheet and the adjacent portions of the propellant bar. The release of these initial electrons results in arc initiation between the PPT electrodes expelling ablated material 50 downstream and producing an opposite force on the thruster. Initiator circuit is advantageously timed to discharge contemporaneously with the potential across the PPT electrodes reaching a maximum. The timing is advantageously within about ten milliseconds of the PPT electrodes reaching their full charge. This is preferably achieved by configuring the initiator so that the effective level of electron emission is reliably achieved within ten milliseconds of switching of the initiator circuit. As the propellant bar is consumed by ablation and ionization of material from the exposed downstream end, it is progressively advanced in the downstream direction 100 (such as by a negator spring 52) so that fresh portions of the conductive and dielectric strips engage the PPT cathode. This allows the initiator to consistently function as long as propellant remains to be fed.

The use of localized thermionic emission takes advantage of the existing electric field between thruster cathode and anode to accelerate the initial electrons, allowing a prior art high voltage pulse to be traded for a low voltage, high current pulse. Because the spark with its high dI/dt characteristics is eliminated, much of the EMI related to the spark itself would be eliminated. The small size allows scaling for small PPT's, as well as consistent localization of the discharge initiation for more consistent impulse bits. Advantageously, the circuit driving the current loop would be transformer isolated and switched at low voltage, eliminating the need for larger, expensive and harder to obtain high voltage parts, including the DI capacitor, the IGBT or SCR, cabling and connectors.

Figure 2:
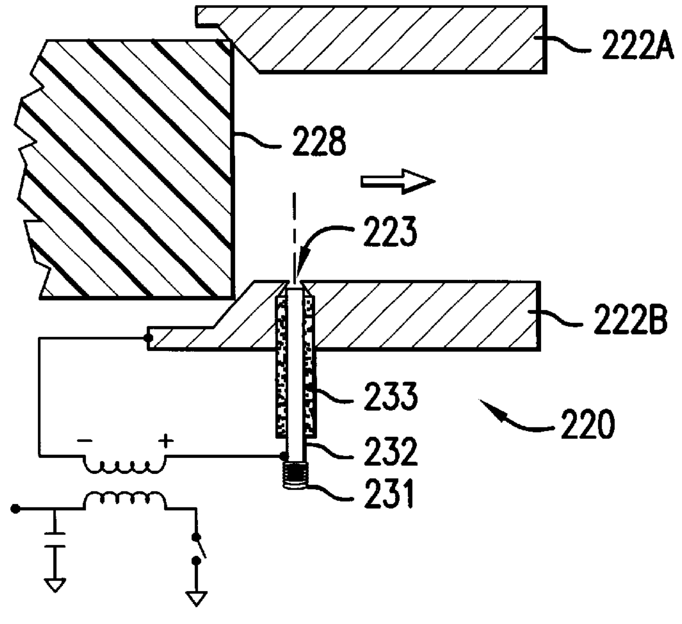
FIG. 2 is semi-schematic longitudinal sectional view of a second PPT ignition system according to principles of the invention.

There may be various variations on the system of FIG. 1. For example, the conductive strip may be otherwise formed and may be embedded in the propellant bar. Alternatively, it may be separate from the propellant bar. An example of one such separated arrangement 220 is shown in FIG. 2. Specifically, a graphite rod 232 is held for progressive advancement transverse to the downstream (exhaust) direction. The rod may be held for advancement by a spring 231 through an insulative tube (e.g., BN, ceramic, and the like) 233 or may be encased in a dielectric sheath (e.g., PTFE). One end of the rod is engaged to the cathode 222B at an aperture 223 therein. The initiator circuit induces current through the rod by applying an electrical potential between the cathode and the other, free, end of the rod. Material is ablated and ionized from the end of the rod engaged to the cathode. The electrons discharged by this ionization exit the aperture and are drawn toward the anode 222A. During travel toward the anode, the electrons may occasionally ionize a piece of the exposed surface of the propellant bar. The resulting ion is accelerated back toward the cathode. The resulting electrons continue to be drawn toward the anode. If the ion impacts the cathode, it may further ionize a portion of the cathode, creating additional electrons.

Figure 3:
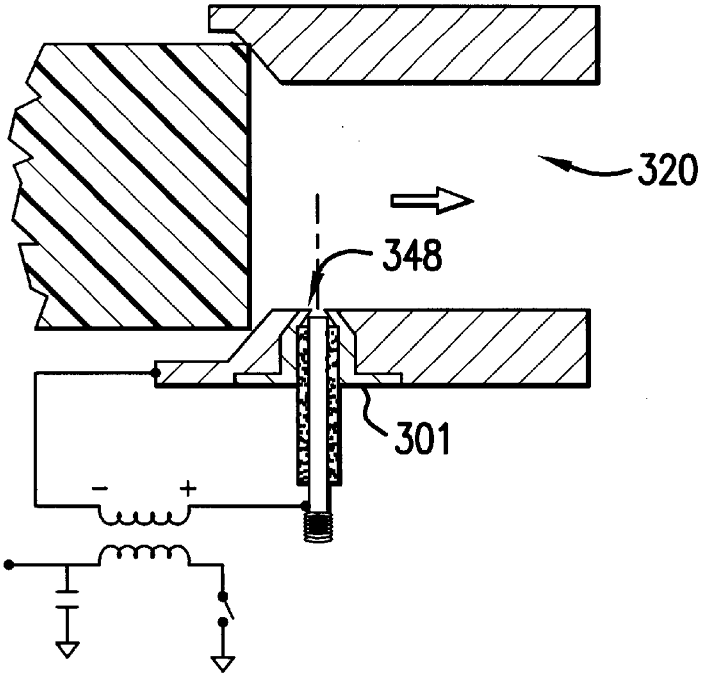
FIG. 3 is semi-schematic longitudinal sectional view of a third PPT ignition system according to principles of the invention.
Figure 4:
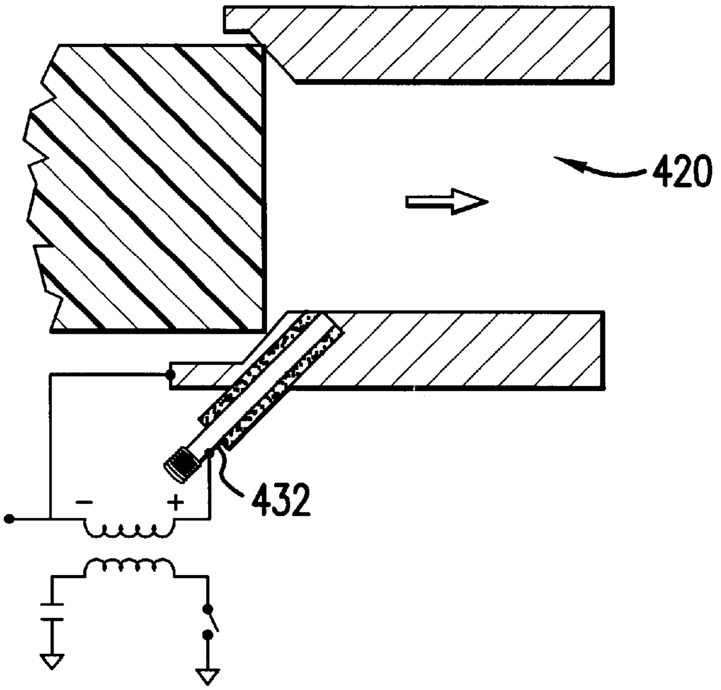
FIG. 4 is semi-schematic longitudinal sectional view of a fourth PPT ignition system according to principles of the invention.

FIGS. 3 and 4 show variations on the basic theme of the embodiment of FIG. 2. In the embodiment 320 FIG. 3, a thermally conductive element is added to control the heating/cooling profile of the thermionic region 348 (e.g., to balance rapid cooling so that subsequent pulses are not prematurely triggered on the one hand with a desire for flow cooling to minimize the time delays and current required to initiate the next pulse). In the embodiment 420 of FIG. 4, the rod 432 is placed at an angle so that it may be more readily accommodated within the PPT housing (not shown). Among other options are doping the graphite and/or the cathode material to reduce the electron work function (e.g., replacing existing sintered tungsten in a copper/nickel matrix cathodes with thoriated tungsten to further facilitate electron emission.

Figure 5:
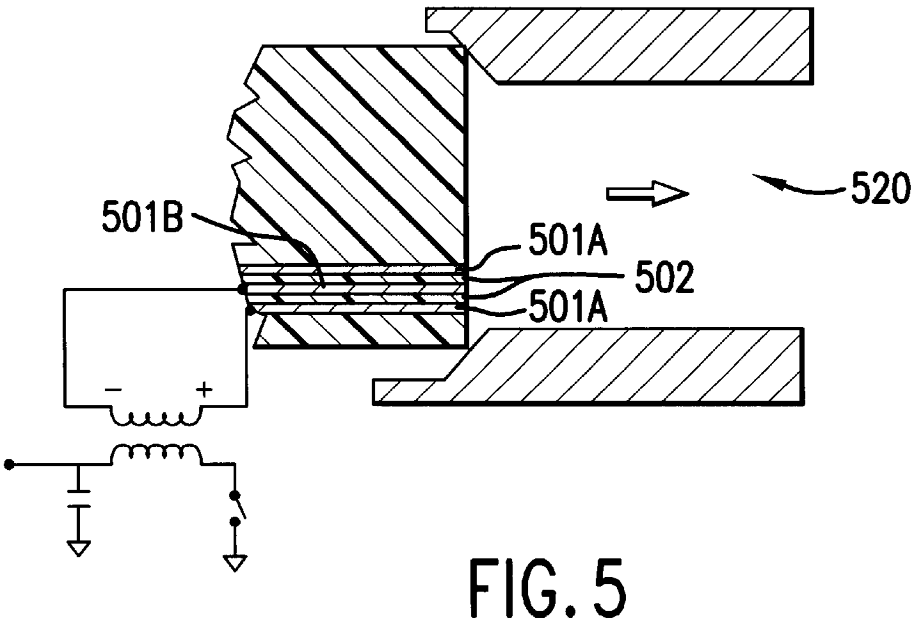
FIG. 5 is semi-schematic longitudinal sectional view of a fifth PPT ignition system according to principles of the invention.

Another alternative is embedding the thermal discharge initiator within the propellant bar. One example 520 of this, shown in FIG. 5, embeds two initiator electrodes 501A and 501B within the propellant bar. At the upstream end of the bar, the initiator circuit is switched to apply a potential between an inner electrode 501B such as a graphite rod and an outer electrode 501A such as a concentric graphite tube separated by an annulus 502 of dielectric material (e.g., PTFE). This can initiate flashover between the inner and outer electrodes at their downstream ends which produces electrons and ions which are effective to initiate arc discharge. In addition to various physical arrangements of electrodes embedded in the propellant bar, a number of electrical/chemical situations may be present and may be utilized to initiate arc discharge. For example, one possibility, and a key departure from other embodiments, is to choose the dimensions and materials of the embedded electrodes and their separating insulator to simulate the electrical properties of a conventional spark plug so that existing high voltage initiation circuits may be utilized. The materials are chosen so that the embedded "spark plug" erodes at substantially the same linear rate as does the propellant bar. In other embodiments of this basic configuration, the insulative material between the electrodes may be chosen to appropriately decay or to receive deposits so that, when the initiator circuit is switched to apply the potential across the initiator electrodes, there is resistive heating of the decayed or deposited material effective to induce thermionic electron emission with or without any localized flashover between the initiator electrodes. In either event, the thermionic emission is effective to induce arc discharge across the PPT electrodes.

Figure 6:
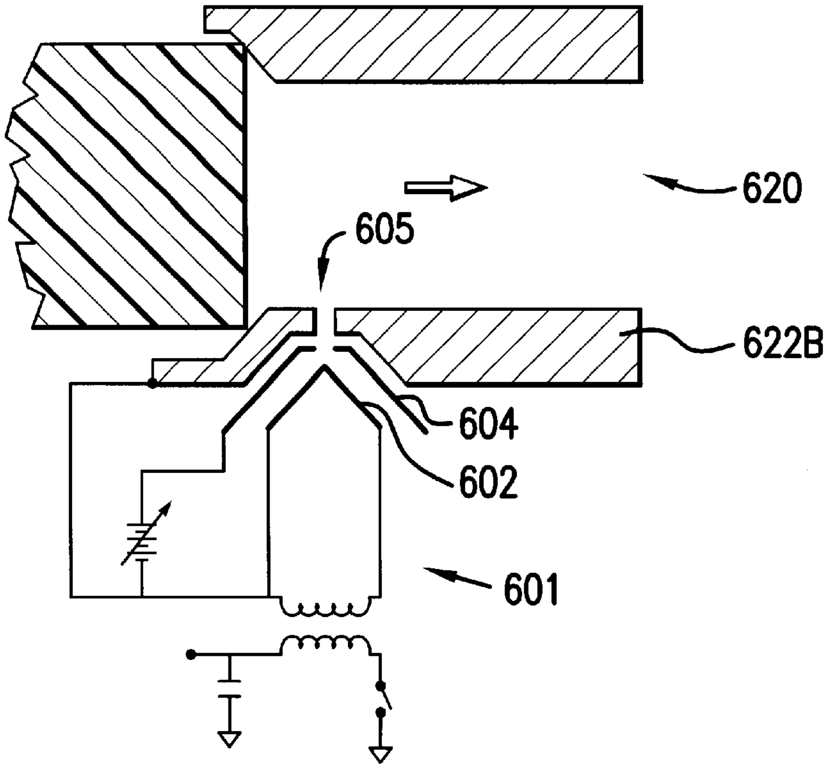
FIG. 6 is semi-schematic longitudinal sectional view of a sixth PPT ignition system according to principles of the invention.

FIG. 6 shows an alternate embodiment 620 of a thruster having an initiator which utilizes an electron gun 601 to produce the necessary electrons. The thermionic emission of electrons is from an emission cathode 602 which is subjected to a low voltage (e.g., 28V) heating current. An annular guard electrode 604 repels ions generated in the main discharge, which could substantially erode the hot emission cathode. The electrons emitted by the gun may be directed through an aperture 605 in the PPT cathode to initiate the arc discharge.

Figure 7:
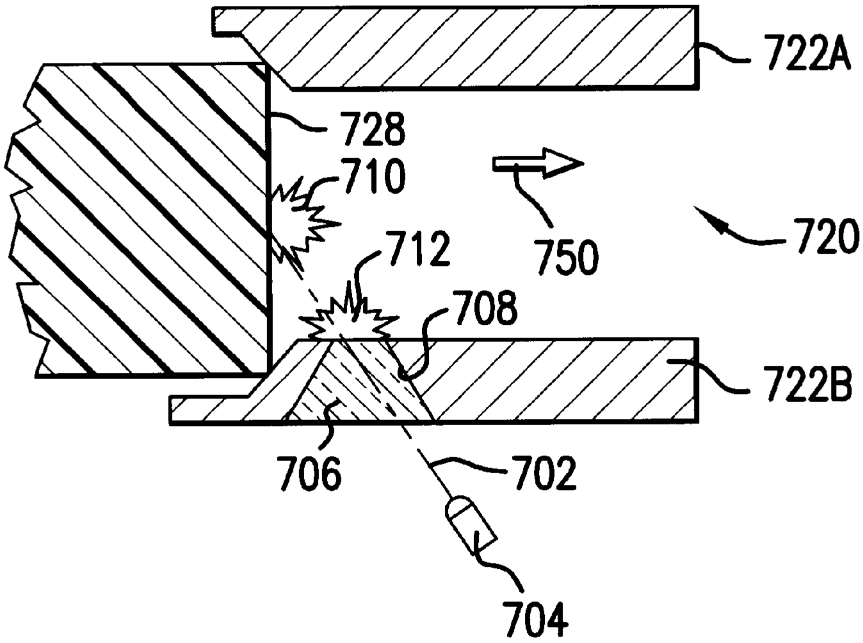
FIG. 7 is semi-schematic longitudinal sectional view of a seventh PPT ignition system according to principles of the invention. Like reference numbers and designations in the various drawings indicate like elements.

FIG. 7 shows yet another method and apparatus 720 for inducing thermionic electron emissions. The light emitted in the beam 702 of a laser 704 is utilized to heat a material. The laser may be positioned to direct its beam through a transparent window 706 (e.g., of quartz) mounted in an aperture 708 of one of the PPT electrodes (preferably the PPT cathode 722B). The beam is directed to ablate material from the exposed downstream surface of the propellant bar. The ablated material 710 is ionized, with the resulting electrons then being drawn toward the anode and the resulting ions then being drawn toward the cathode. As in the other embodiments, the generated electrons and ions induce arcing between the cathode and anode 722A accelerating a plasma generated from the propellant downstream, producing a downstream directed thrust and an associated upstream directed force on the PPT.

Alternate ablative or sacrificial materials may be utilized in laser-based embodiments of the ignition system. For example, a graphite or other rod, sheet, or the like may be affixed to or embedded in the propellant bar at the location of incidence of the laser beam. The beam heats the exposed material, raising the material's temperature sufficiently to allow electrons to be liberated by the existing electric field resulting from the potential between the PPT anode and PPT cathode. After each pulse, there may be deposits of material (e.g., carbon from a PTFE propellant bar) which is deposited on the inboard surfaces of the PPT anode and PPT cathode as well as on an inboard surface of any window through which the laser beam is to be directed. On subsequent pulses, the laser beam may ablate and ionize these deposits (712) from the inboard surface of the window, providing a further source of electrons. Optionally, an initial coating may be placed on the inboard surface of the window during manufacture, which coating is consumed the first time or times the thruster is pulsed and is ultimately continuously replenished by the deposits described above. In alternate embodiments (not shown) the laser may be directed other than through an aperture in either electrode. In other alternate embodiments (not shown) the laser may be directed at one of the PPT electrodes (by way of example, at the cathode electrode through a window in the anode electrode). Ionization of material from the incident electrode may initiate arc discharge. In other alternate embodiments (not shown) the laser may be directed to a photoelectric material to induce photoelectric emission of electrons.

Figure 8:
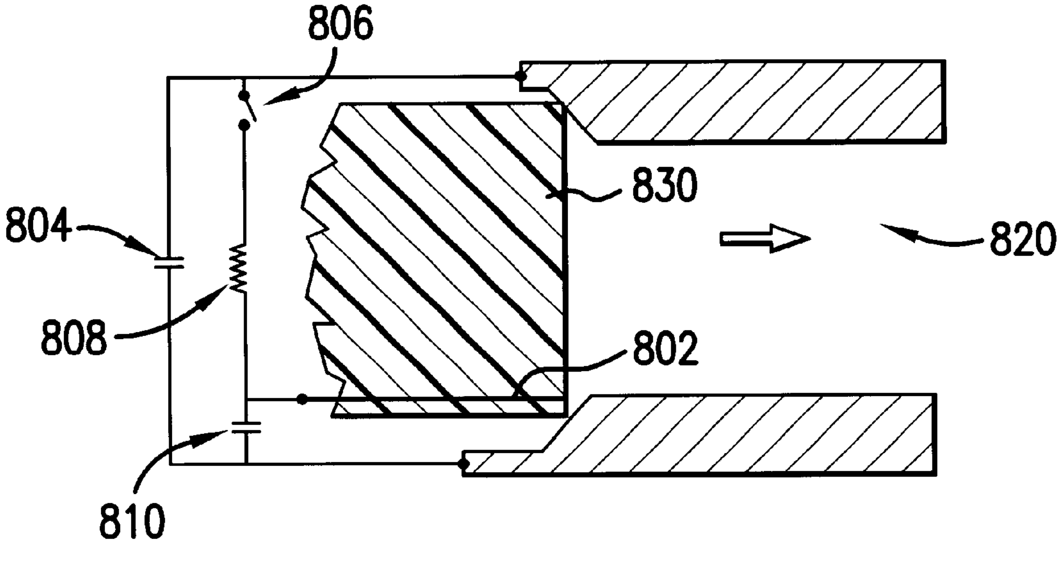
FIG. 8 is semi-schematic longitudinal sectional view of an eighth PPT ignition system according to principles of the invention.

FIG. 8 shows a thruster embodiment 820 wherein a conductive wire trigger electrode 802 is embedded in the propellant bar 830. The upstream end of the trigger electrode is connected to the anode potential of a main capacitor 804 via a high-voltage switch 806 and a current-limiting impedance 808. The electrode is connected to the cathode potential via a trigger capacitor 810. In some instances where rapid pulsing is not critical, it may be possible to eliminate the high-voltage switch in favor of a self-timed trigger. By way of example, if the RC time constant of the trigger capacitor and impedance could be set much longer than the several hundred millisecond long main capacitor charge time, the switch can be eliminated, and the trigger capacitor would fire only after it charged up. The material for the electrode 802 would be chosen and sized to ablate at a rate comparable to the propellant bar around it so that a consistent interface between the trigger and the cathode would be presented throughout the life of the propellant bar and thruster. The mechanism for arc initiation would be some combination of high voltage breakdown over a shorter distance, resistive vaporization of a junction between the trigger and the cathode and/or thermionic emissions from such a junction.

In this embodiment, the voltage from the main storage capacitor itself is routed to a third electrode touching or near the cathode. This embodiment is a variation on the embodiment in FIG. 1 in that there is no separate power source for the initiation device. Instead the main discharge capacitor is the source of the seed energy required to start the arc. The mechanism of discharge initiation is believed similar to that sought in FIG. 1, namely an explosive destruction of the interface caused by joule heating of the small piece of material actually bridging the interface between the electrode and the cathode. In addition, if there is no actual contact between the third electrode and the cathode, it is thought that a voltage breakdown mechanism can apply over this gap, which is orders of magnitude smaller than the main discharge gap. Other variations on this embodiment might be to provide a small but definite gap between the third electrode and rely on a voltage breakdown mechanism.

One or more embodiments of the present invention have been described. Nevertheless, it will be understood that various modifications may be made without departing from the spirit and scope of the invention. For example, various principles of the invention may be applied to a variety of pulsed plasma thruster configurations such as that shown in the aforementioned Cassady paper including multiple bar configurations and others utilizing a gas propellant instead of a solid propellant bar. Some, such as bar and initiation conductor configurations may be applied to thrusters having a variety of initiation systems and parameters. By no means finally, different physical configurations of the initiator and materials may be substituted for those described herein. Accordingly, other embodiments are within the scope of the following claims.

What is claimed is:

1. A pulsed plasma thruster comprising:

a pair of electrodes being:

an anode; and a cathode spaced apart from the anode;

a voltage source for applying a voltage between the cathode and the anode to positively charge the anode relative to the cathode;

a solid propellant bar extending longitudinally and held for progressive advancement in a downstream longitudinal direction to a gap between the cathode and anode; and an initiator for initiating arc discharge between the anode and cathode by inducing thermionic emission of electrons, which electrons are drawn toward the anode and tend to induce ionization of material on an exposed surface of the bar so as to initiate said arc discharge in a flashover.

2. The thruster of claim 1 wherein the voltage source comprises a capacitive energy storage device which discharges to provide the arc discharge.

3. The thruster of claim 1 wherein the electrons are emitted from a member selected from the group consisting of:

a conductive member integral with the bar;

a conductive member separate from the bar and held for progressive advancement to maintain engagement with the cathode as material is removed from an end of the conductive member;

an electrode of an electron gun; and a portion of the cathode.

4. The thruster of claim 1 wherein the initiator comprises:

a laser, positioned to direct a beam through an aperture in at least a first electrode of the cathode and anode.

5. The thruster of claim 4 wherein the aperture contains a window substantially transparent to the beam while a remainder of the first electrode is substantially opaque to the beam.

6. The thruster of claim 1 wherein the initiator comprises:

a conductive member having a first end and a second end, the second end engageable with a first electrode of the anode and the cathode; and a second voltage source, coupled to the first electrode and to the first end of the conductive member, for inducing an electric current between the first electrode and the conductive member effective to resistively heat at least the conductive member at the second end thereof to induce said thermionic emission of electrons.

7. The thruster of claim 6 wherein the conductive member is held for progressive advancement to maintain engagement with the first electrode as material is removed from the second end of the conductive member.

8. The thruster of claim 6 wherein the conductive member is integral with the bar.

9. The thruster of claim 6 wherein the conductive member is secured to a surface of the bar and wherein the initiator further comprises a thin layer of dielectric material secured to the conductive member opposite the bar.

10. The thruster of claim 6 wherein the conductive member is embedded in the bar.

11. The thruster of claim 6 wherein the conductive member is separate from the bar and is held for said progressive advancement at least partially transverse to a downstream direction to maintain engagement with the first electrode at an aperture therein.

12. The thruster of claim 6 wherein the conductive member is contained within and advanceable through a dielectric outer sheath.

13. The thruster of claim 6 wherein the bar consists essentially of PTFE.

14. The thruster of claim 6 wherein the first electrode is the cathode.

15. The thruster of claim 6 wherein the initiator comprises:

an electron gun, positioned to direct said electrons into the gap between the cathode and anode.

16. A pulsed plasma thruster comprising:

an anode;

a cathode spaced apart from the anode;

a voltage source for applying a thruster voltage between the cathode and the anode to positively charge the anode relative to the cathode;

a solid propellant bar held for progressive advancement in a direction to a gap between the cathode and anode; and an initiator for initiating arc discharge between the anode and cathode by heating a material to an elevated temperature at which a local electric field resulting from the thruster voltage is sufficient to induce emission of electrons from said material, which emission of electrons is effective to initiate said arc discharge.

17. The thruster of claim 16 wherein the material is provided by a member selected from the group consisting of:

a conductive member integral with the bar;

a conductive member separate from the bar and held for progressive advancement to maintain engagement with the cathode as said material is removed from an end of the conductive member;

an electrode of an electron gun; and a portion of the cathode.

18. The thruster of claim 16 wherein the initiator operates at voltages less than the thruster voltage.

19. With a pulsed plasma thruster of the type having an anode, a cathode spaced apart from the anode, a voltage source for applying a thruster voltage between the cathode and the anode to positively charge the anode relative to the cathode, and a solid propellant bar held for progressive advancement in a direction to a gap between the cathode and anode, a method for repeatedly initiating a thrust impulse comprising repeatedly:

applying said thruster voltage;

heating a material to an elevated temperature at which a local electric field resulting from the thruster voltage is sufficient to induce emission of electrons from said material, which emission of electrons is effective to initiate an arc discharge between the anode and cathode which arc discharge in turn ablates fuel from an exposed surface of the bar and ionizes said fuel into a plasma slug accelerates in a downstream direction producing an associated upstream impulse on the thruster.

20. The method of claim 19 wherein the heating is timed so that the arc discharge is initiated in a target interval of the thruster voltage reaching a maximum voltage.

21. The method of claim 19 wherein target interval is no greater than 10 ms.

22. The method of claim 19 wherein said heating is performed without use of a spark plug.

23. With a pulsed plasma thruster of the type having an anode, a cathode spaced apart from the anode, a voltage source for applying a thruster voltage between the cathode and the anode to positively charge the anode relative to the cathode, and a propellant source for introducing propellant to a gap between the cathode and anode, a method for repeatedly initiating a thrust impulse comprising repeatedly:

applying said thruster voltage;

heating a material to an elevated temperature at which a local electric field resulting from an applied voltage no greater than the thruster voltage is sufficient to induce emission of electrons from said material, which emission of electrons is effective to initiate an arc discharge between the anode and cathode which arc discharge in turn ionizes said propellant into a plasma slug which accelerates in a downstream direction producing an associated upstream impulse on the thruster.

24. The method of claim 23 wherein the applied voltage is selected from the group consisting of:

the thruster voltage;

a voltage applied between electrodes of an electron gun;

a voltage applied to resistively heat a sacrificial member which is held for progressive advancement; and a voltage utilized to drive a laser.

25. A pulsed plasma thruster having an anode, a cathode spaced apart from the anode, a voltage source for applying a thruster voltage between the cathode and the anode to positively charge the anode relative to the cathode, and a propellant source for introducing propellant to a gap between the cathode and anode, and an initiator having at least one initiator electrode having an end in a position effective to initiate an arc discharge between the anode and cathode when an initiator voltage is applied to the initiator electrode, characterized in that:

the initiator electrode is held for progressive advancement to maintain the end of the initiator electrode in the position as material is eroded from the end of the initiator electrode.

26. The thruster of claim 25 wherein the at least one initiator electrode includes an initiator cathode and an initiator anode, both integral with a bar of the propellant, the initiator voltage being applied between the initiator cathode and the initiator anode.

* * * * *